May 19, 1931. J. H. BASS 1,805,861
FENCE ROW MOWER
Filed July 28, 1930
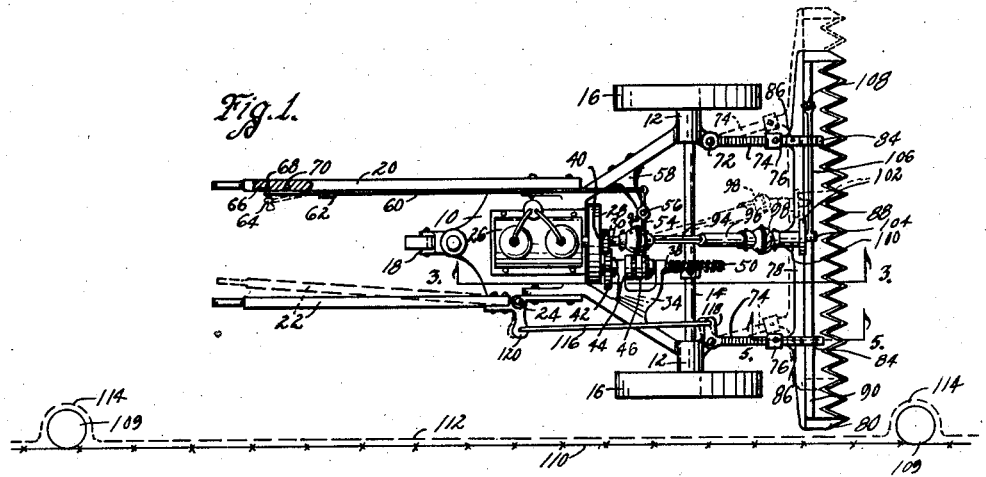
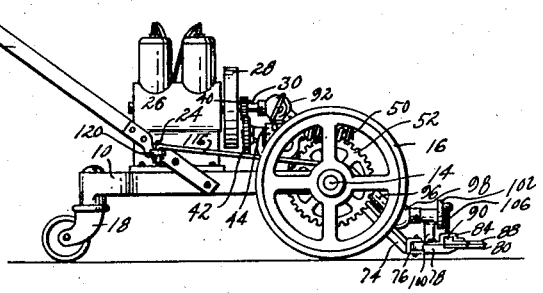
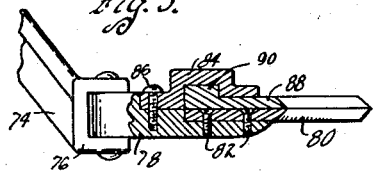
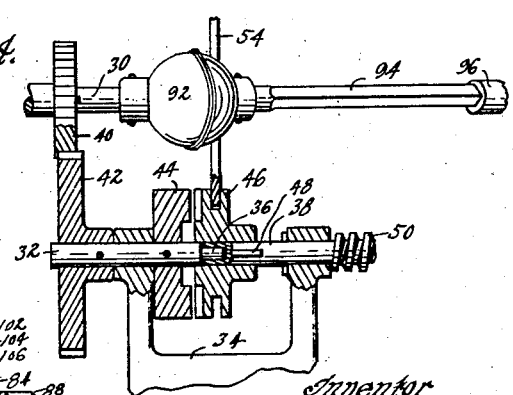
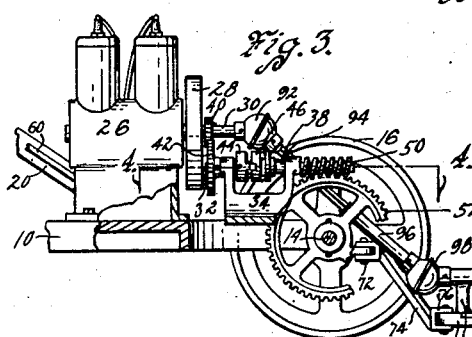
Inventor
~ James H. Bass ~
by Bair, Freeman & Sinclair
Attorneys
Witness
H. S. Nunzenmair Patented May 19, 1931

1,805,861

UNITED STATES PATENT OFFICE

JAMES H. BASS, OF WAUKEE, IOWA

FENCE ROW MOWER

Application filed July 28, 1930. Serial No. 471,224.

The object of my invention is to provide a fence row mower which is simple, durable and comparatively inexpensive to manufacture.

A further object is to provide a mower which is adapted for general mowing operations as well as mowing along fence rows.

More particularly, it is my object to provide a mower construction consisting of a wheeled frame with guide handles thereon, a mower member being provided which is supported by links pivoted to the wheeled frame in such a way that the mower member may be shifted transversely by one of the guide handles so that the mower member itself may be caused to miss fence posts and other objects without altering the course of the wheeled frame.

Still another object is to provide power means on the wheeled frame operatively connected with the wheels of the wheeled frame for advancing the mower and operatively connecting it with the mower member, which is preferably in the form of a reciprocating mower blade.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of my fence row mower.

Figure 2 is a side elevation of the same.

Figure 3 is an enlarged sectional view on the line 3—3 of Figure 1.

Figure 4 is an enlarged sectional view on the line 4—4 of Figure 3 showing a clutch mechanism and Figure 5 is an enlarged sectional view on the line 5—5 of Figure 1 showing parts of the mower member.

On the accompanying drawing, I have used the reference numeral 10 to indicate generally a frame. Hubs 12 are formed on the frame 10 and a drive shaft 14 is journalled in the hubs 12. Traction wheels 16 are secured to the drive shaft 14. The wheels 16 support the frame 10 in conjunction with a caster wheel 18 located at the rear end of the frame 10.

Guiding handles 20 and 22 are provided, the handle 20 being rigidly secured to the frame 10 and the handle 22 being pivoted to the frame 10 at 24. For advancing the mower I provide a power means such as a small horse power engine 26 suitably secured to the frame 10. The fly wheel of the engine 26 is indicated at 28 and the crank shaft thereof at 30. As best shown in Figure 4, a counter shaft 32 is journalled in a bracket 34 and has a reduced portion 36 journalled in the rear end of a worm shaft 38 which is also journalled in the bracket 34. By means of a pinion and gear 40 and 42 respectively, rotation of the crank shaft 30 is imparted to the counter shaft 32.

A jaw clutch member 44 is secured to the counter shaft 32. A companion clutch member 46 is slidably but non-rotatably mounted on the worm shaft 38, a key 48 being provided to prevent rotation of the member 46 thereon.

A worm 50 is secured to the worm shaft 38 and meshes with a worm gear 52 secured to the drive shaft 14. For selectively moving the clutch member 46 into and out of engagement with the clutch member 44 I provide a forked lever 54 which is pivoted at 56 to a bracket 58. A clutch rod 60 connects with the lever 54 and extends upwardly along the guide handle 20. The rod 60 is slidably mounted through a bearing 62 and is provided with a knob 64 by which the upper end of the rod may be swung to the dotted line position shown in Figure 1 for withdrawing a pin 66 from an opening 68 whereupon the rod 60 may be slid to another position for the pin to engage in an opening 70 to retain the clutch in engaged position.

Pivoted at 72 on the hubs 12 are arms 74 which extend forwardly and from the frame 10. Pivoted at 76 on the arms 74 is a supporting bar 78 which extends transversely of the mower.

A stationary serrated mower blade 80 is secured to the supporting bar 78 as best shown in Figure 5 by means of countersunk screws 82 or the like. A pair of guide fingers 84 are secured by screws 86 to the supporting bar 78 adjacent the pivotal connections 76. A reciprocating mower blade 88 is provided with a beaded rear edge 90 slidably guided in the members 84.

Means is provided for reciprocating the mower blade 88 from the crank shaft 30. Such means consists of a universal joint 92, telescoping shaft members 94 and 96, a universal joint 98 and a stub shaft mounted in a bearing 100 which is formed on the supporting bar 78. A crank disk 102 is secured to the stub shaft and has a crank pin 104. The crank pin 104 is connected by a link 106 with an ear 108 on the reciprocating mower blade 88. Thus it will be seen that rotation of the engine crank shaft 30 will impart reciprocating motion to the mower blade 88.

The swinging arms 74 are provided so that the mower member, consisting of the stationary and reciprocating blades 80 and 88, may be swung transversely so as to miss objects such for instance as posts 109 (see Figure 1) on which a fence 110 is supported.

The dotted line 112 indicates the edge of the grass being cut and it will be noted that it swings around the post 109 as indicated at 114. All this may be done with the wheels 16 traveling in a straight line without changing their course to miss the posts.

As the arms 74 swing transversely, the universal joints 92 and 98 and the telescoping shaft 94—96 maintain an operative connection between the mower member and the power means without binding of parts. The arms 74 are conveniently swung sidewise by the pivoted guide handle 22 which is connected by means of a link 116 with a bell crank arm 118 formed on one of the arms 74. The guide handle 22 has an arm 120 extending sidewise as best shown in Figure 1 with which the rear end of the link 116 is connected.

It is obvious therefore that the handle 20 acts as a guide handle for the mower in general, particularly the frame 10 and the wheels 16 and 18 while the guide handle 22 serves to impart guiding movement to the mower member itself with respect to the frame 10 so that the mower can be made to miss objects without changing the course of the frame 10.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a mower of the character disclosed, a wheeled frame, a mower member, mowing mechanism carried thereby, means for supporting the mower member transversely adjustable with respect to said frame and a lever for so adjusting the mower member.

2. In a mower of the character disclosed, a wheeled frame, a guiding handle therefor, a mower member, means for supporting the mower member transversely movable with respect to said frame and a second handle swingably mounted and operatively connected with said mower member for moving the same transversely of the wheeled frame.

3. A mower comprising a wheeled frame, power means thereon, a mower member arranged and movable transversely of said frame, a connection between said power means and said mower member for operating the latter from the former and a pair of handles on said frame, one for guiding said wheeled frame and the other for guiding said mower member with respect to said frame.

4. A mower comprising a wheeled frame, power means thereon, a mower member arranged and movable transversely of said frame, a connection between said power means and said mower member for operating the latter from the former and a pair of handles on said frame, one for guiding said wheeled frame and the other one being pivoted to the frame and operatively connected with said mower for guiding it with relation to the frame.

5. A mower comprising a wheeled frame, power means thereon, supporting arms pivoted to said frame, a mower member pivoted to said arms whereby the mower member moves transversely of said frame when said arms are swung and a lever on said frame for swinging said arms as desired.

6. A mower comprising a wheeled frame, power means thereon, supporting arms pivoted to said frame, a mower member pivoted to said arms whereby the mower member moves transversely of said frame when said arms are swung, guiding handles on said wheeled frame, one for guiding the frame and the other for swinging said arms.

7. A mower comprising a wheeled frame, power means thereon, supporting arms pivoted to said frame, a mower member pivoted to said arms whereby the mower member moves transversely of said frame when said arms are swung, said power means being operatively connected with said mower member by a universal joint and sliding shaft connection, guiding handles on said wheeled frame, one for guiding the frame and the other for swinging said arms.

8. A mower comprising a wheeled frame, power means thereon, supporting arms pivoted to said frame, a mower member pivoted to said arms whereby the mower member moves transversely of said frame when said arms are swung, said power means being operatively connected with said mower member and with the wheels of said wheeled frame, guiding handles on said wheeled frame, one for guiding the frame and the other for swinging said arms.

Des Moines, Iowa, July 18, 1930.

JAMES H. BASS.